March 12, 1940.  W. LEUCHTENBURG  2,193,693
SHAFT MARKER
Filed Oct. 13, 1938
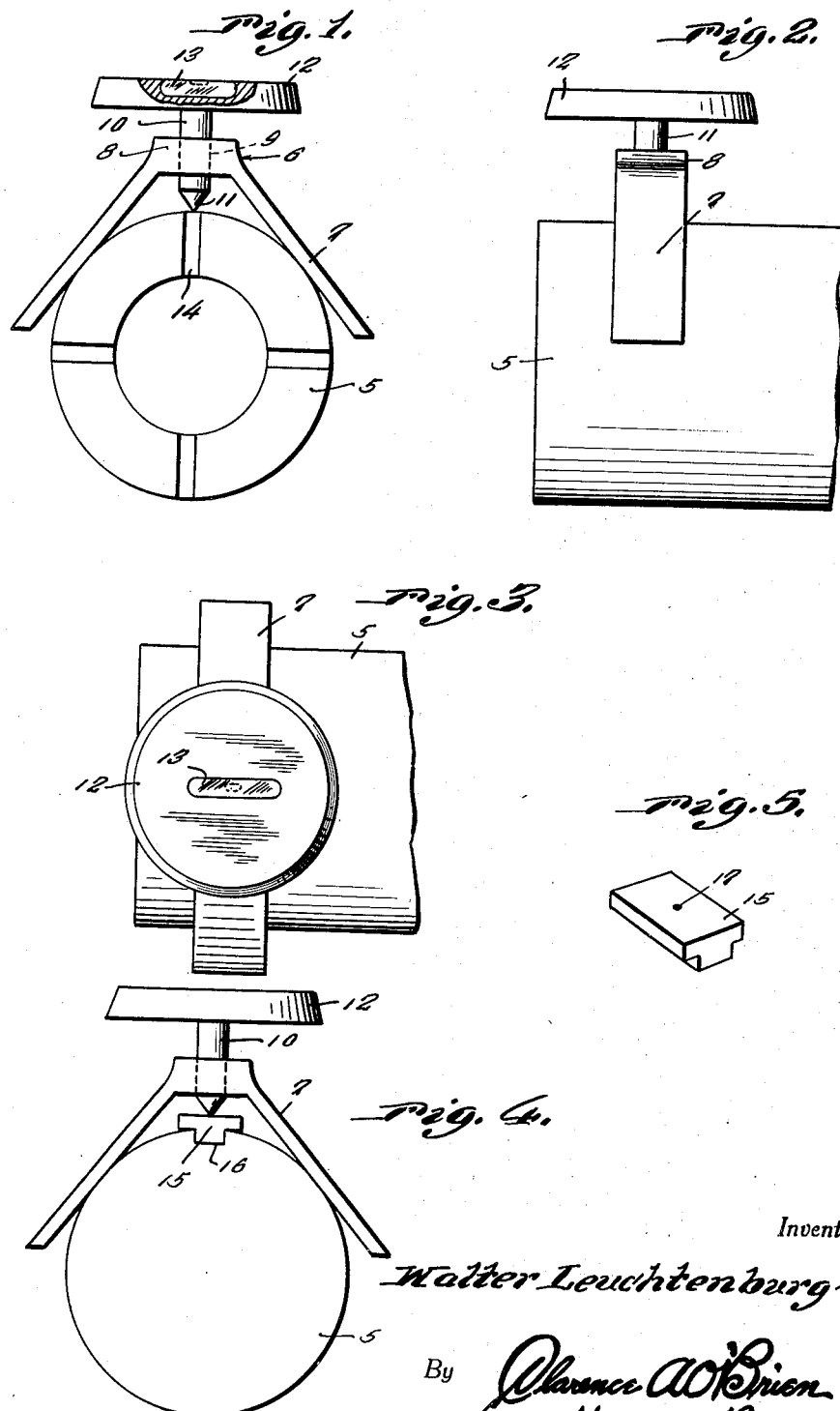
Inventor
Walter Leuchtenburg
By Clarence A. O'Brien
and Hyman Berman
Attorneys Patented Mar. 12, 1940

2,193,693

UNITED STATES PATENT OFFICE 2,193,693

SHAFT MARKER

Walter Leuchtenburg, Davenport, Iowa

Application October 13, 1938, Serial No. 234,826

1 Claim. (Cl. 33—189)

The present invention relates to marking instruments designed particularly for use in connection with circular or cylindrical work, such as shafts and the like, for the purpose of marking the same to indicate the position of cuts or grooves to be formed in the shaft, and also to embody a leveling attachment for the instrument to indicate the proper position of the shaft at which the same is to be clamped for working on the shaft by a milling machine.

A further object is to provide an instrument of this character of simple and practical construction, which is efficient and reliable in performance, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout, and in which—

Figure 1 is an end elevational view of a shaft showing the instrument in position thereon and with parts broken away and shown in section.

Figure 2 is a fragmentary side elevational view of the shaft with the instrument shown in position thereon.

Figure 3 is a top plan view.

Figure 4 is an end elevational view showing the instrument when used in connection with a groove or keyway indicating block, and Figure 5 is a perspective view of the block.

Referring now to the drawing in detail, the numeral 5 designates a shaft and 6 designates the support for the instrument which comprises a substantially V-shaped member including the legs 7 connected at their converging ends by a relatively flat block 8, the latter having a bore 9 extending therethrough.

A pin 10 has a snug sliding fit in the bore 9, one end of the pin being pointed as at 11 while the other end of the pin is formed with an enlarged head 12 within which is countersunk a spirit level 13, the upper surface of the head being on a plane with the upper edge of the spirit level to prevent injury to the latter.

It is believed the use of the instrument will be apparent to those skilled in the art, the legs of the support being placed in a straddling position on the shaft 5 and after the proper position of the shaft has been determined through the use of the spirit level 13 the shaft is clamped in a suitable vise (not shown) and held in such position while milling machine is employed to form the desired keyway, groove or the like in the indicated position on the shaft. The slots or markings 14 in the end of the shaft may be initially provided to indicate the correct setting of the instruments and after the latter is placed in position as shown in Figures 1 to 3 inclusive, the pin 10 may be depressed to form the desired mark or scratch in the surface of the shaft.

Should more than one groove or keyway be desired and cut in the shaft, a block of conventional construction, such as illustrated at 15 in Figures 4 and 5, may be placed in the keyway 16, the upper surface of the block having a shallow recess 17 formed therein designating the center of the keyway for engagement by the pointed end of the pin 10 and when the instrument is thus placed in position as shown in Figure 4 and the shaft 5 secured in adjusted position in the vise, as determined by the spirit level, the end of the shaft may then be marked with the usual center line for the purpose of determining the position of the subsequent keyways to be cut in the shaft.

It is believed the details of construction and manner of use of the instrument will be readily understood from the foregoing without further detailed explanation.

Having thus described the invention, what I claim is:

A center square for use in leveling a shaft preparatory to milling comprising a support including a pair of relatively divergent legs adapted to straddle the shaft, a bridge part connecting said legs in spaced apart relation, a manipulative level carrying disc surmounting the bridge part, a spirit level countersunk in the top of said disc diametrically thereof and centered in the axis of the disc, and means to mount said disc on said bridge part for rotary manipulation to adjust the level into different angular positions relative to the axis of the shaft comprising a pin extending axially from said disc and rotatably mounted in said bridge part, said pin being pointed and slidable in said part for adjustment to bear on shafts of different diameters and thereby hold the support in set position, the point of the pin providing a marker.

WALTER LEUCHTENBURG.